(12) United States Patent
Kikuchi (10) Patent No.: US 7,168,289 B2
(45) Date of Patent: Jan. 30, 2007

(54) METHOD AND DEVICES OF MEASURING PHYSICAL QUANTITIES

(75) Inventor: Takayuki Kikuchi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 83 days.

(21) Appl. No.: 10/876,361

(22) Filed: Jun. 24, 2004

(65) Prior Publication Data

US 2005/0011267 A1    Jan. 20, 2005

(30) Foreign Application Priority Data

Jul. 14, 2003  (JP) ............................ P2003-274210

(51) Int. Cl.
    *G01P 21/00* (2006.01)
(52) U.S. Cl. ..................... 73/1.37; 73/504.12
(58) Field of Classification Search ............... 73/1.37, 73/504.12, 504.15, 504.16; 310/329
    See application file for complete search history.

(56) References Cited

U.S. PATENT DOCUMENTS

| | | | |
|---|---|---|---|
| 4,791,815 A * | 12/1988 | Yamaguchi et al. | 73/504.16 |
| 4,930,351 A * | 6/1990 | Macy et al. | 73/504.04 |
| 5,585,562 A * | 12/1996 | Kurata et al. | 73/504.16 |
| 5,635,642 A | 6/1997 | Nonomura et al. | |
| 5,723,788 A | 3/1998 | Terada et al. | |
| 5,998,911 A * | 12/1999 | Kikuchi et al. | 310/370 |
| 6,227,048 B1 * | 5/2001 | Kikuchi et al. | 73/504.12 |
| 6,698,292 B2 | 3/2004 | Kikuchi | |
| 2002/0021059 A1 * | 2/2002 | Knowles et al. | 310/370 |

FOREIGN PATENT DOCUMENTS

| | | |
|---|---|---|
| EP | 0 829 703 A1 | 3/1998 |
| EP | 1 174 684 A2 | 1/2002 |
| EP | 1 174 684 A3 | 4/2005 |
| JP | 2001-012952 A1 | 1/2001 |
| JP | 2003-337025 A1 | 11/2003 |

* cited by examiner

*Primary Examiner*—John E. Chapman
(74) *Attorney, Agent, or Firm*—Burr & Brown (57) ABSTRACT

The present invention provides a method of measuring a physical quantity using a vibrator. The vibrator has a plurality of driving vibration arms, a plurality of detection vibration arms, films for adjusting a weight provided on the driving vibration arms, and detecting electrodes provided on the detection vibration arms. A driving vibration is excited in the vibrator, and output signals are output from the detecting means based on a detection vibration excited in the vibrator responsive to the physical quantity. The weight of each of the films is adjusted based on a comparison of the output signals from the detection vibration arms.

8 Claims, 7 Drawing Sheets

METHOD AND DEVICES OF MEASURING PHYSICAL QUANTITIES

This application claims the benefit of Japanese Patent Application P2003-274210 filed on Jul. 14, 2003, the entirety of which is incorporated by reference.

BACKGROUND OF THE INVENTION

1. Field of the Invention

The present invention relates to a method and device of measuring a physical quantity.

2. Related Art Statement

In an application of mounting a vibratory gyroscope on a vehicle, the gyroscope is used in an extremely wide temperature range. For example, it is required that the gyroscope properly functions in a wide temperature range of −40° C. to +85° C. Even when the resonance frequency of a pair of bending vibration arms is adjusted at a constant quantity at room temperature, the change and deviation of the resonance frequency may be large as the temperature is considerably changed to a high or low temperature. The change or deviation of resonance frequency thus results in a so-called zero point temperature drift.

The assignee filed a Japanese Patent publication 2000-107725A, and disclosed that tapered parts are provided at both roots of a bending vibration arm on both sides, respectively, to reduce the zero point temperature drift.

The inventors have studied such technique and found the following problems, depending on the material of the vibrator. That is, as described in Japanese patent publication 2000-107725A, tapered parts are provided in the roots of the side faces of a bending vibration arm so that the tapered parts have substantially the same planar shape. It is considered that the vibration mode of the bending vibration arm may be made more symmetrical to reduce the zero point temperature drift. When the zero point temperature drift is measured for each of the vibrators actually fabricated, however, the drift may deviate among the vibrators. The deviation of zero point temperature drift may be increased so that the yield of off-specification products is increased.

The reasons are as follows. Even when the zero point temperature drift of the vibrator cannot be made zero, it is possible to substantially cancel the drift by providing a correction circuit of the drift in a detection circuit of a vibratory gyroscope when the drift is made substantially constant. Even if the deviation of the drift of the vibrator actually fabricated is larger, the drift may be cancelled by means of the correction circuit in one vibrator. In this case, however, the drift in another vibrator may be considerably different from that in the one vibrator in which the drift is cancelled with the circuit. It is not possible to cancel the drift in another vibrator so that the performance of a vibratory gyroscope having this vibrator may be made out of specification.

The assignee filed a Japanese Patent application 2002-68862A and found the following. In an etching step, a photoresist is applied on both of upper and lower faces of a wafer. Photo masks are mounted on the photoresists, and the photo masks on the upper and lower faces are aligned with each other. The photoresist are exposed to light to harden it, and the photo masks are removed to complete the patterning of the photo resists. The wafer is then etched so that an outline corresponding with the pattern of the photoresist is formed on the wafer. When the photo masks are mounted on both of the upper and lower faces of the wafer and aligned with each other, alignment error may occur between the photo masks. In this case, when a bending vibration is excited in a bending mode along a plane of the vibrator, an unnecessary vibration component in the direction of Z-axis perpendicular to the plane is induced at the same time. Such kind of the unnecessary vibration component in Z-axis is induced in a bending vibration arm for detection at the same time to result in a noise in the detecting signal.

According to a Japanese Patent application 2002-68862A, it is disclosed that the cross sectional shape of each bending vibration arm is made a specific elongate shape to prevent the above problems. According to the method, however, the design of the thickness of the wafer is considerably limited.

SUMMARY OF THE INVENTION

An object of the present invention is to reduce a noise and temperature drift due to unbalance of the shape of a vibrator actually produced, when the vibrator is used for measuring a physical quantity.

The present invention provides a method of measuring a physical quantity using a vibrator. The vibrator comprises a plurality of driving vibration arms, a plurality of detection vibration arms, films for adjusting a weight provided on said driving vibration arms, respectively and detecting means provided on said detection vibration arms, respectively. The method comprises the steps of:

exciting a driving vibration in the vibrator;

outputting output signals from the detecting means based on a detection vibration excited in the vibrator responsive to the physical quantity; and adjusting the weight of the film based on a comparison of said output signals from the detection means.

According to the present invention, when a driving vibration is excited in a vibrator, output signals are output from the detecting means based on a detection vibration excited in the vibrator responsive to the physical quantity. The weight of each of the films is adjusted based on a comparison of the output signals from the detection vibration arms. After the adjustment, the ratio of the weights of the driving vibration arms is changed, so that the pattern and mode of the driving vibration are slightly changed as well as those of the detection vibration. It is thus possible to adjust the weights of the films so that the noises in the output signal drawn from the detecting means are reduced.

These and other objects, features and advantages of the invention will be appreciated upon reading the following description of the invention when taken in conjunction with the attached drawings, with the understanding that some modifications, variations and changes of the same could be made by the skilled person in the art.

DETAILED DESCRIPTION OF THE INVENTION

Figure 1:
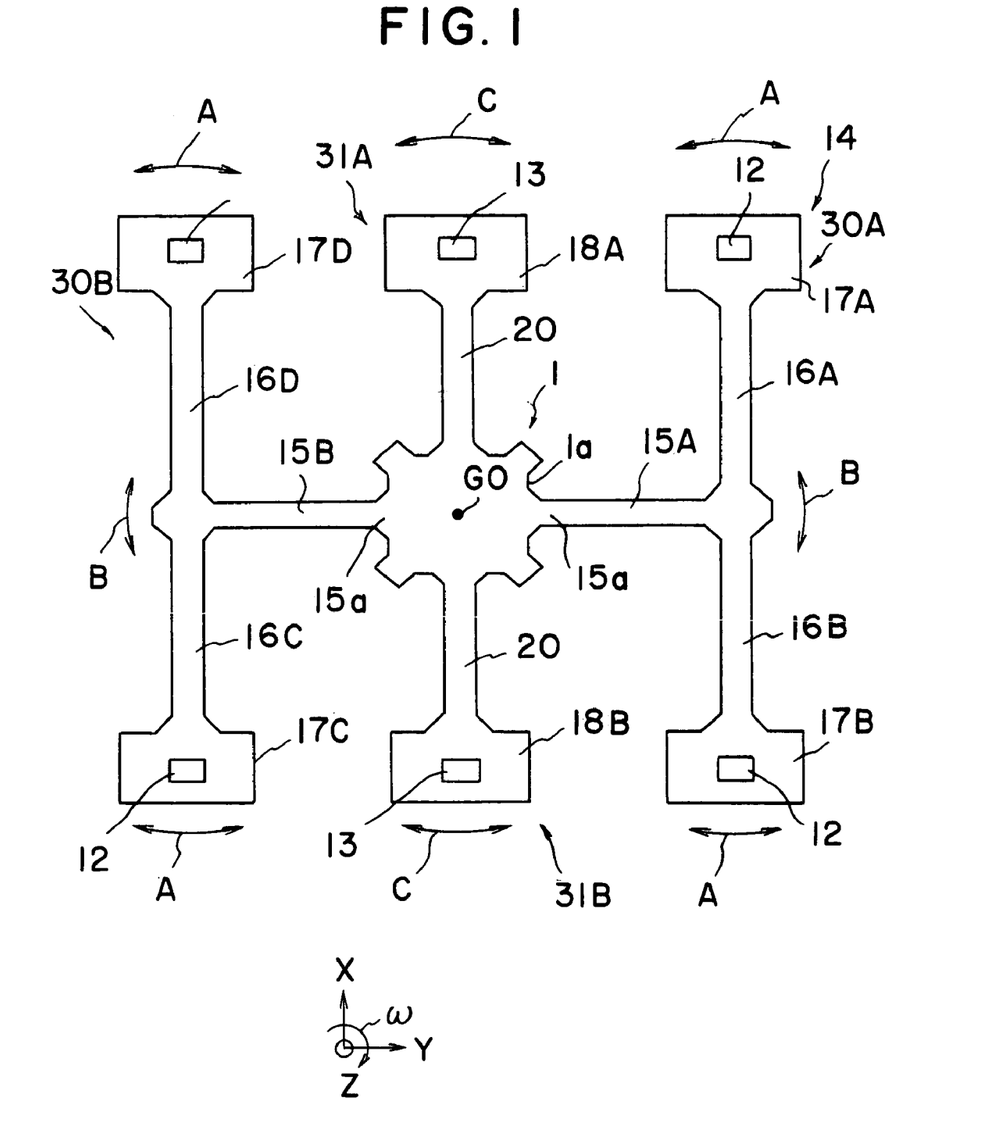
FIG. 1 is a plan view showing a vibrator 14 according to one embodiment of the present invention.

The shape and motion of a vibrator 14 according to the present embodiment will be described first, referring to FIG. 1. The vibrator 14 has a base part 1, a pair of driving vibration systems 30A, 390B and a pair of detection vibration systems 31A, 31B. The base part 1 of the present example has a square shape of quad-symmetrical with respect to the center of gravity GO (the center of gravity when the vibrator is not vibrated) of the vibrator. The driving vibration systems 30A, 30B and detection vibration systems 31A, 31B are protruded from the fixing part 1, respectively, at the respective sides 1a.

The driving vibration systems 30A and 30B have elongated supporting portions 15A and 15B protruding from the peripheral part 1a of the base portion 1 in radial directions and a pair of driving vibration arms 16A, 16B and 16C, 16D protruding in a direction perpendicular to the longitudinal direction of the supporting portions 15A and 15B, respectively. According to the present example, wide weight portions or hammer heads 17A, 17B, 17C and 17D are provided at the tip ends of the driving vibration arms, respectively. A through hole 12 is formed in each of the weight portions.

Each of the detection vibration systems 31A and 13B comprises an elongate detection vibration arm 20 protruding in a radial direction from the peripheral part 1a of the base portion 1. Wide weight portions or hammer heads 18A and 18B are provided at the tip ends of the detection vibration arms 20. A through hole 13 is formed in each of the weight portions.

The mechanism of vibration of the vibrator 14 will be described below. Each of the driving vibration arms 16A and 16B is vibrated in bending vibration mode as an arrow "A" in the same phase using driving electrodes as described later, and each of the driving vibration arms 16C and 16D is vibrated in bending vibration mode as an arrow "A" in the same phase. The center of gravity of the whole driving vibration of the bending vibration arms 16A to 16D is positioned on or near the center of gravity "GO" of the vibrator.

In the detection vibration mode, the vibrator 14 is turned in a specified plane (X-Y plane) as an arrow ω. Responsive to the turning, Colioris force is applied on the vibrator 14, so that the supporting parts 15A and 15B are vibrated in bending motion as an arrow "B" around the root 15a. The phases of the bending vibration modes of the supporting portions 15A and 15B are in inverse phase with respect to the center of gravity "GO". Responsive to this, each of the detection vibration pieces 20 is vibrated as an arrow "C" in bending mode around the root to the base portion 1. When the detection vibration arm 20 is vibrated in bending motion, a signal voltage is induced in each signal electrode as described later. A turning angular rate is calculated based on the signal voltages.

Figure 2:
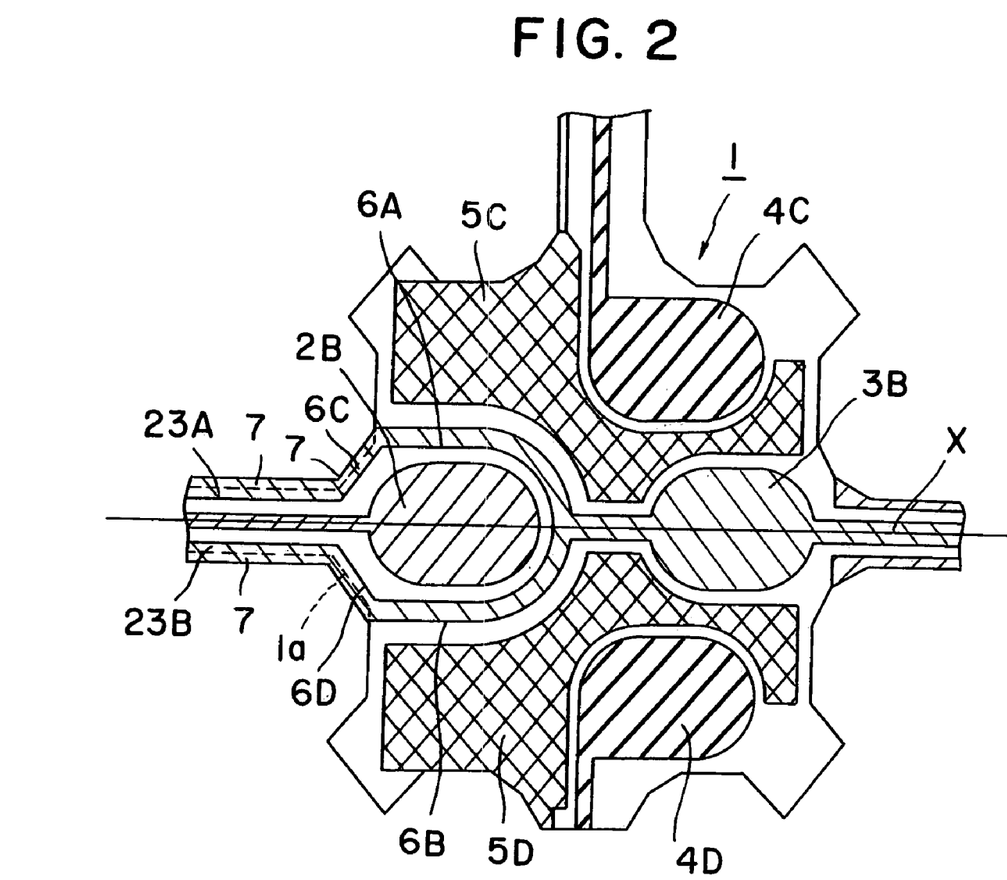
FIG. 2 is a plan view showing a pattern of electrode pads in a base portion 1 of the vibrator 14.
Figure 3:
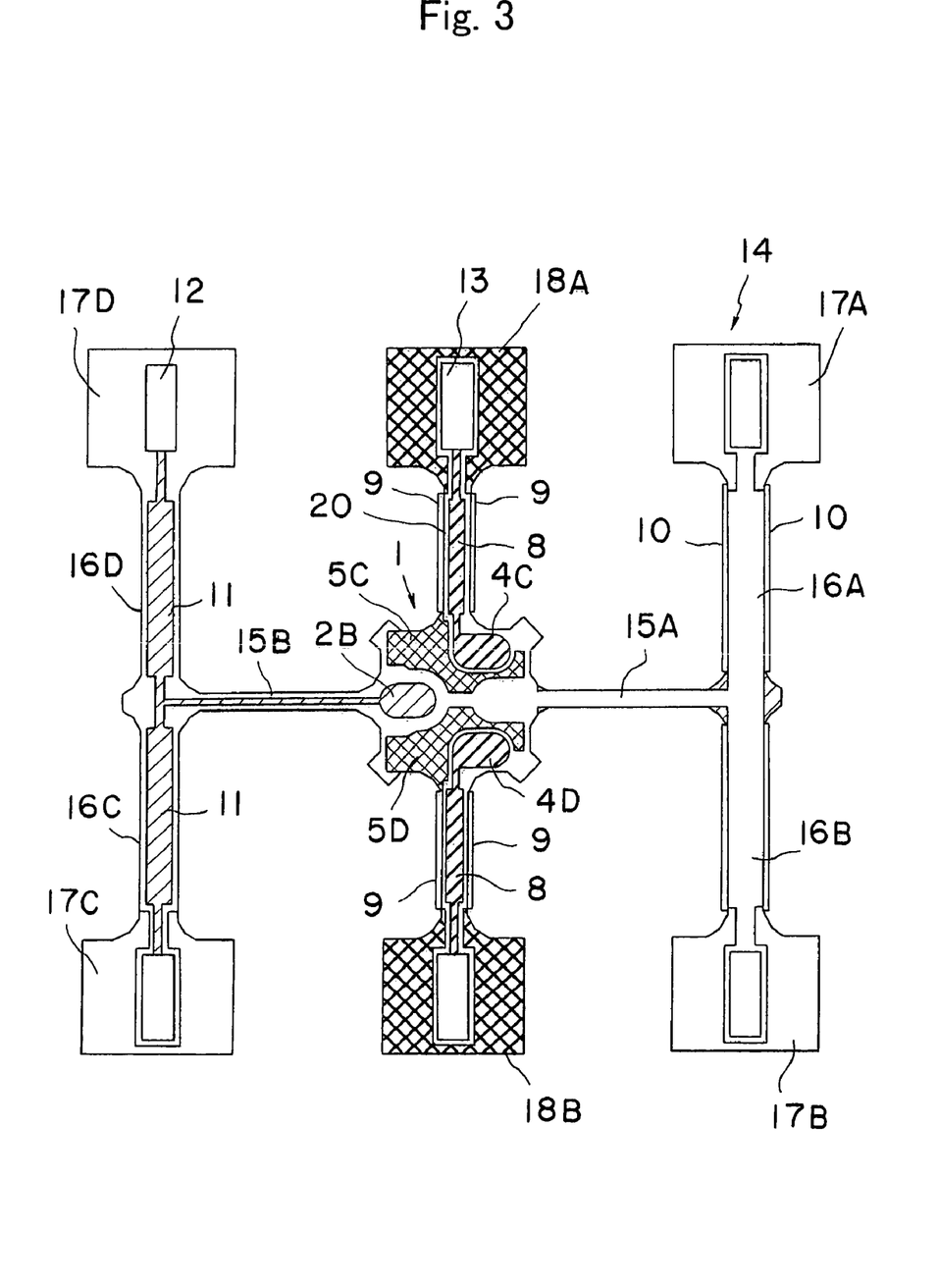
FIG. 3 is a plan view showing a part of electrode wiring patterns on a surface of the vibrator 14.
Figure 4:
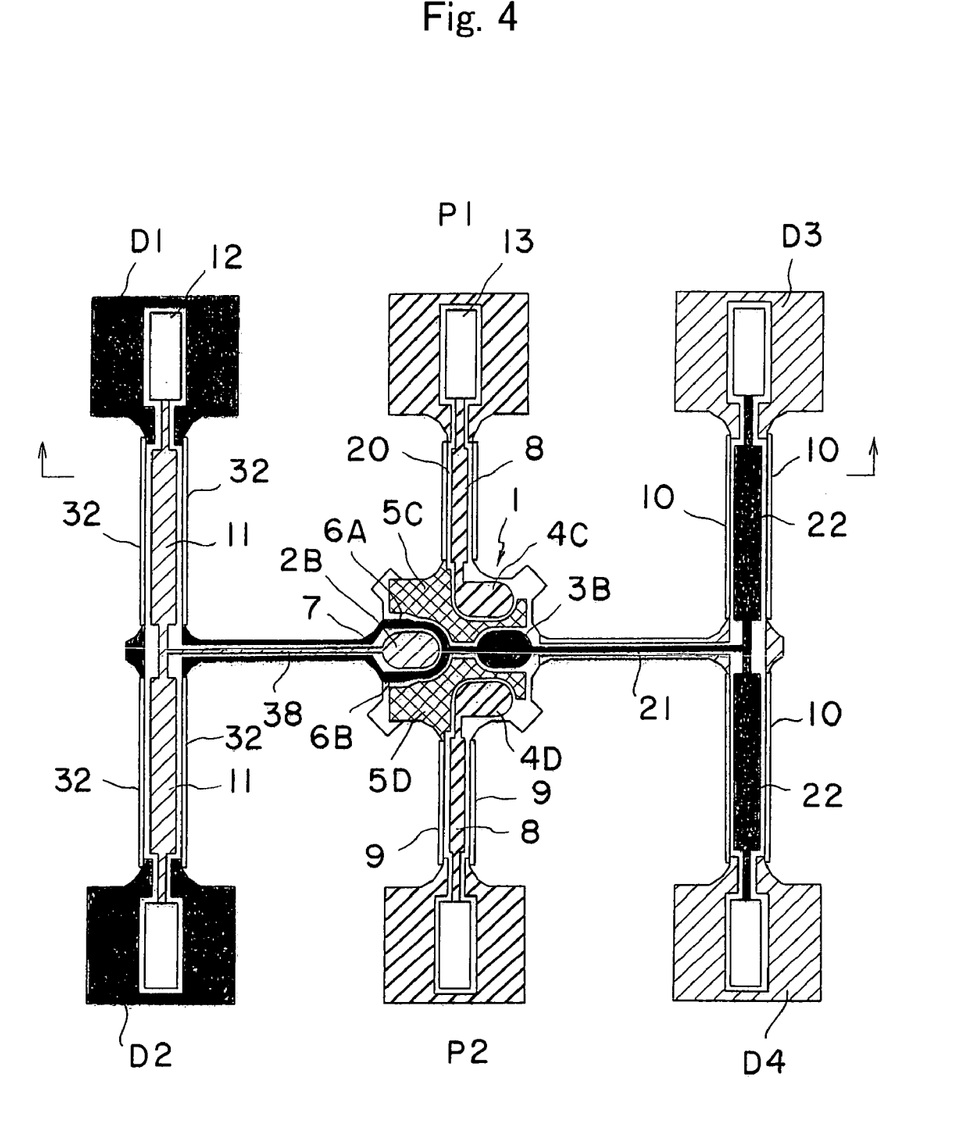
FIG. 4 is a plan view showing electrode wiring patterns on the vibrator 14.

FIG. 2 is a plan view showing electrode pattern of the base portion 1. FIG. 3 is a plan view showing a part of electrode pattern on the surface of the vibrator, and FIG. 4 is a plan view showing the whole of the electrode pattern on the surface of the vibrator.

Ground electrodes 22 for driving are provided on the surfaces (and back faces not shown) of the driving vibration arms 16A and 16B, respectively. Signal electrodes 10 for driving are provided on the side faces, respectively. Signal electrodes 11 for driving are provided on the surfaces (and back faces not shown) of the driving vibration arms 16C and 16D, respectively, and ground electrodes 32 for driving are provided on the side faces, respectively. Alternating current voltages are applied on the signal electrodes 10 and 11 for driving and ground electrodes 22 and 32 for driving, respectively, so that the driving vibration arms are vibrated in bending motion along an X-Y plane.

Signal electrodes 8 for detection are provided on the surface (and the back face not shown) of the detection vibration arms 20, respectively, and ground electrodes 9 for detection are provided on the side faces. As the detection vibration arms are vibrated in bending motion along an X-Y plane, alternating current and signal voltages are induced between the signal electrodes 8 for detection and ground electrodes 9 for detection.

Particularly as shown in FIG. 2, signal pads 2B for driving, ground pads 3B for driving, two signal pads 4C and 4D for detection and ground pads 5C and 5D for detection are provided on the surface of the base portion 1. Each of the signal electrodes 10 and 11 for driving is electrically connected to the signal pad 2B for driving on the base portion 1 through a wiring 38. Each of the ground electrodes 22 and 32 for driving is electrically connected to the ground pad 3B for detection on the base portion 1 through a wiring 21. According to the present example, the ground pads 3B for driving are connected to a pair of wirings 6as and 6B, which surround the signal pads 2B for driving and connected to wirings 6C and 6D on the edge of the base portion 1. The wirings 6C and 6D are provided on the surface of the base portion 1. The wirings 6A and 6D are communicated with wirings 7 on the side faces and ground wirings 23A and 23B on the surface of the supporting portion 15B, respectively.

The signal pads 4C and 4D for detection are electrically connected with the signal electrodes 8 for detection, respectively. The ground pads 5C and 5D for detection are connected with the ground electrodes 9 for detection on the side faces of the detection vibration arm, respectively.

According to the present example, a plurality of signal pads 4C and 4D are provided at positions symmetrical with respect to a straight line "X" connecting the signal pad 2B for driving and ground pad 3B for driving. It is thus possible to cancel electrostatic couplings of the signal pads for driving and signal pads 4C and 4D for detection. Further, according to the present example, a plurality of ground pads 5C and 5D are provided at positions symmetrical with respect to the straight line "X".

Films D1, D2, D3 and D4 for adjusting weight are provided on the weight portions 17A, 17B, 17C and 17D of the driving vibration arms, respectively.

Figure 6:
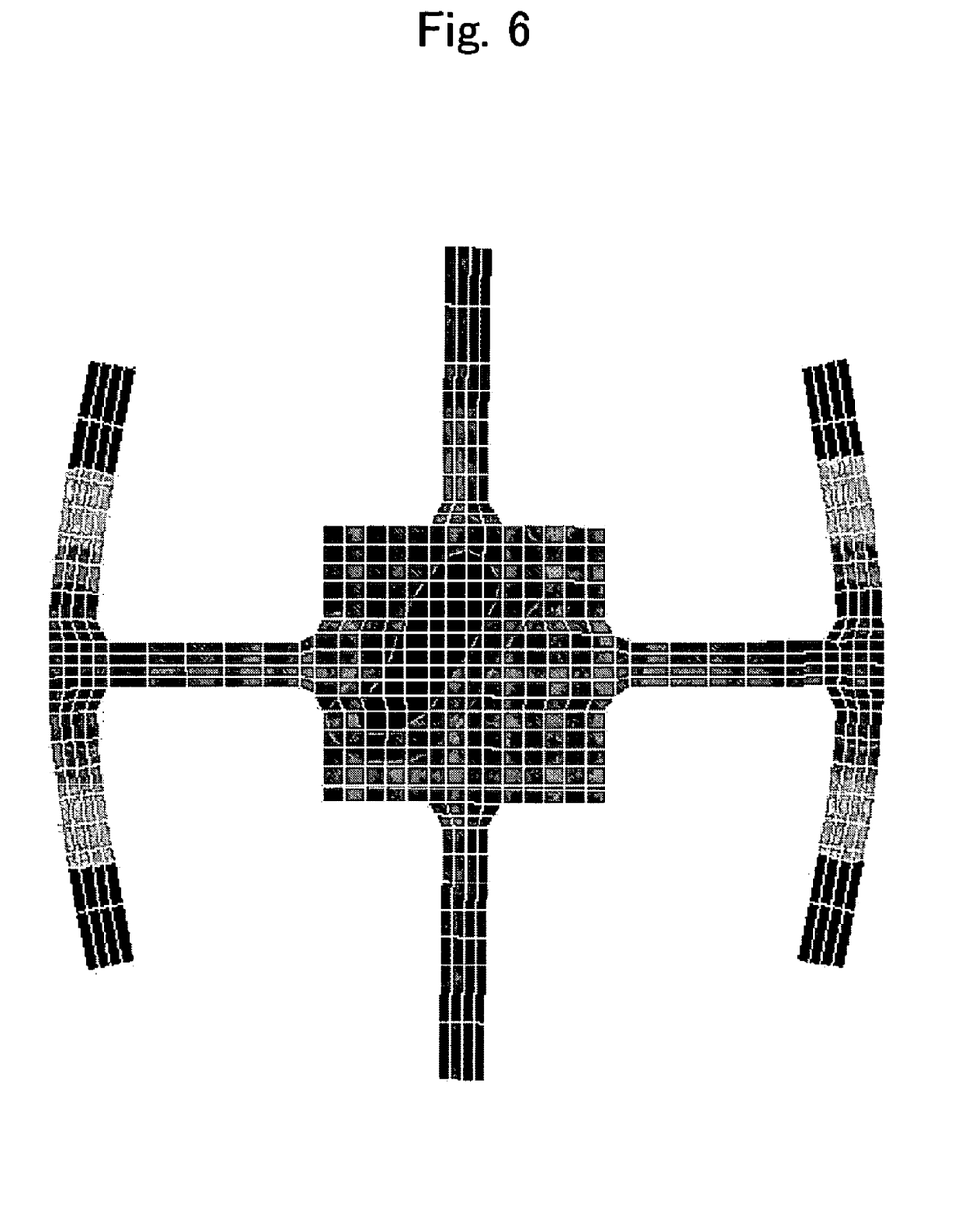
FIG. 6 is a view showing the distribution of dislocation in the driving vibration mode in the vibrator 14, wherein unbalance of the dislocation pattern is observed.
Figure 7:
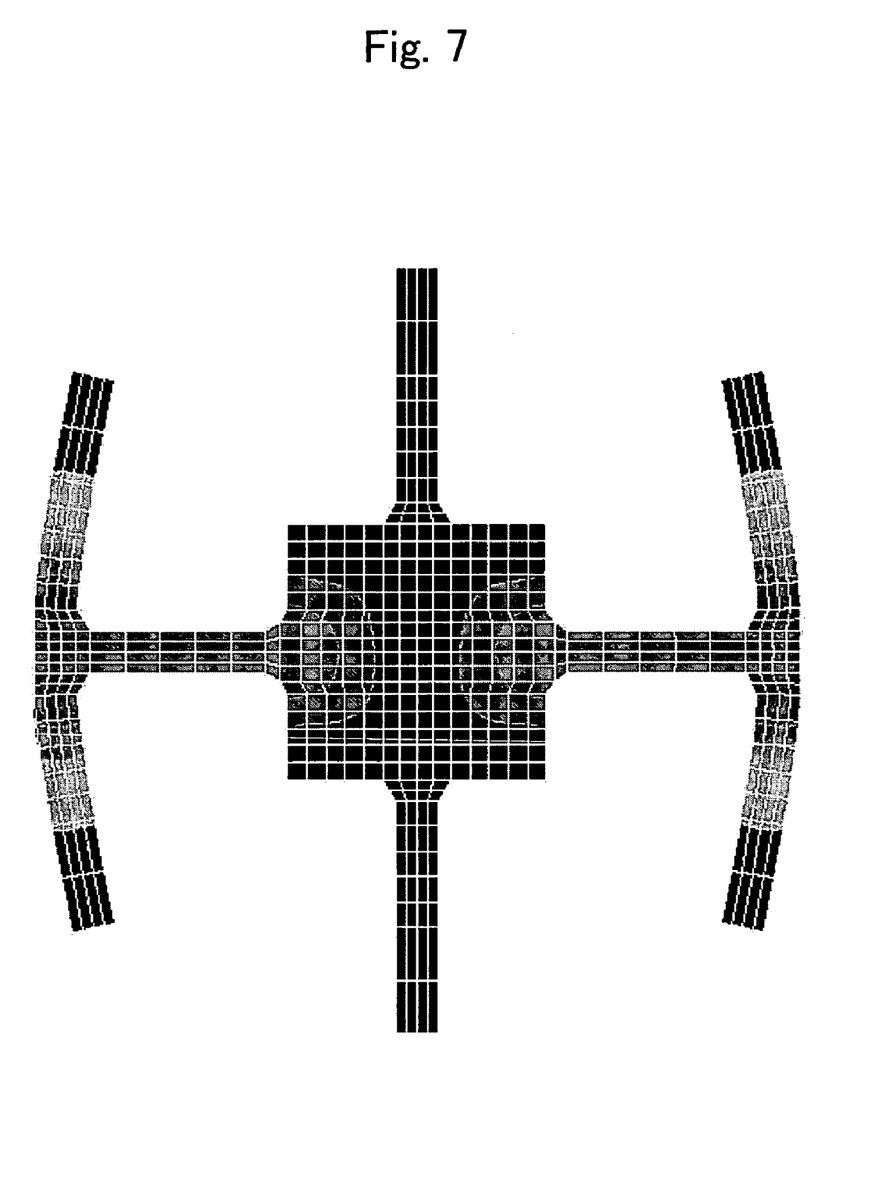
FIG. 7 is a view showing the distribution of dislocation in the driving vibration mode in the vibrator 14, wherein the above unbalance of the dislocation pattern is adjusted and reduced.

The unbalance of the weights of the driving vibration arms 16A, 16B, 16C and 16D results in, for example, distribution of dislocation shown in FIG. 6 (driving vibration mode) after the frequency of driving vibration is adjusted. As shown in FIG. 6, as the dislocation is larger, the shading become darker. According to the example shown in FIG. 6, a region having a larger dislocation (darker shading) is elongated diagonally across the base portion 1. The driving vibration having such irregular dislocation distribution may result in a detection vibration in which the detection vibration arm is dislocated in the direction of Z-axis (a direction perpendicular to the paper face). The dislocation of the detection vibration arm in the direction of Z-axis results in a noise in a detection signal. Contrary to this, when the weights of the driving vibration arms are well balanced, the dislocations are substantially symmetrical with respect to the center vertical line in the base portion 1, as shown in FIG. 7.

When the unbalance is induced, for example, as shown in FIG. 6, the unbalance adversely affects the detection signal as the noise in each detection signal. According to the present invention, the detection signals output from a plurality of the detection means are compared with each other to obtain the differences to be monitored. The weights of the films D1 to D4 are subject to adjustment so that the differences approach a specific quantity. A method of the adjustment is exemplified in table 1.

phase of P1 is negative. In this case, the weight of the weight adjusting film D3 is removed.

In the other cases, the weight adjusting film subjected to the removal of weight is selected as shown in table 1.

The material for the weight adjusting film may particularly preferably be a metal film or metal oxide film. When the film comprises a metal film or metal oxide film, it is possible to advantageously avoid a drift over time. The metal film for the weight adjusting film may preferably be a gold film, a multilayer film of gold and chromium, a multilayer film of gold and titanium, silver film, a multilayer film of silver and chromium, a multilayer film of silver and titanium, a lead film or platinum film. The metal oxide film may preferably be $TiO_2$ film. When gold film is selected as

TABLE 1

| | | | | Arm requiring Weight removal |
|---|---|---|---|---|
| Frequency of Detection vibration > Frequency of Driving vibration | Frequency of Spurious vibration > Frequency of Driving vibration | Signal P1 > Signal P2 | Phase of P1 is positive | D2 |
| | | | Phase of P1 is negative | D4 |
| | | Signal P1 < Signal P2 | Phase of P2 is positive | D1 |
| | | | Phase of P2 is negative | D3 |
| | Frequency of Spurious vibration < Frequency of Driving vibration | Signal P1 > Signal P2 | Phase of P1 is positive | D3 |
| | | | Phase of P1 is negative | D1 |
| | | Signal P1 < Signal P2 | Phase of P2 is positive | D4 |
| | | | Phase of P2 is negative | D2 |
| Frequency of Detection vibration < Frequency of Driving vibration | Frequency of Spurious vibration > Frequency of Driving vibration | Signal P1 > Signal P2 | Phase of P1 is positive | D1 |
| | | | Phase of P1 is negative | D3 |
| | | Signal P1 < Signal P2 | Phase of P2 is positive | D2 |
| | | | Phase of P2 is negative | D4 |
| | Frequency of Spurious vibration < Frequency of Driving vibration | Signal P1 > Signal P2 | Phase of P1 is positive | D4 |
| | | | Phase of P1 is negative | D2 |
| | | Signal P1 < Signal P2 | Phase of P2 is positive | D3 |
| | | | Phase of P2 is negative | D1 |

Figure 5:
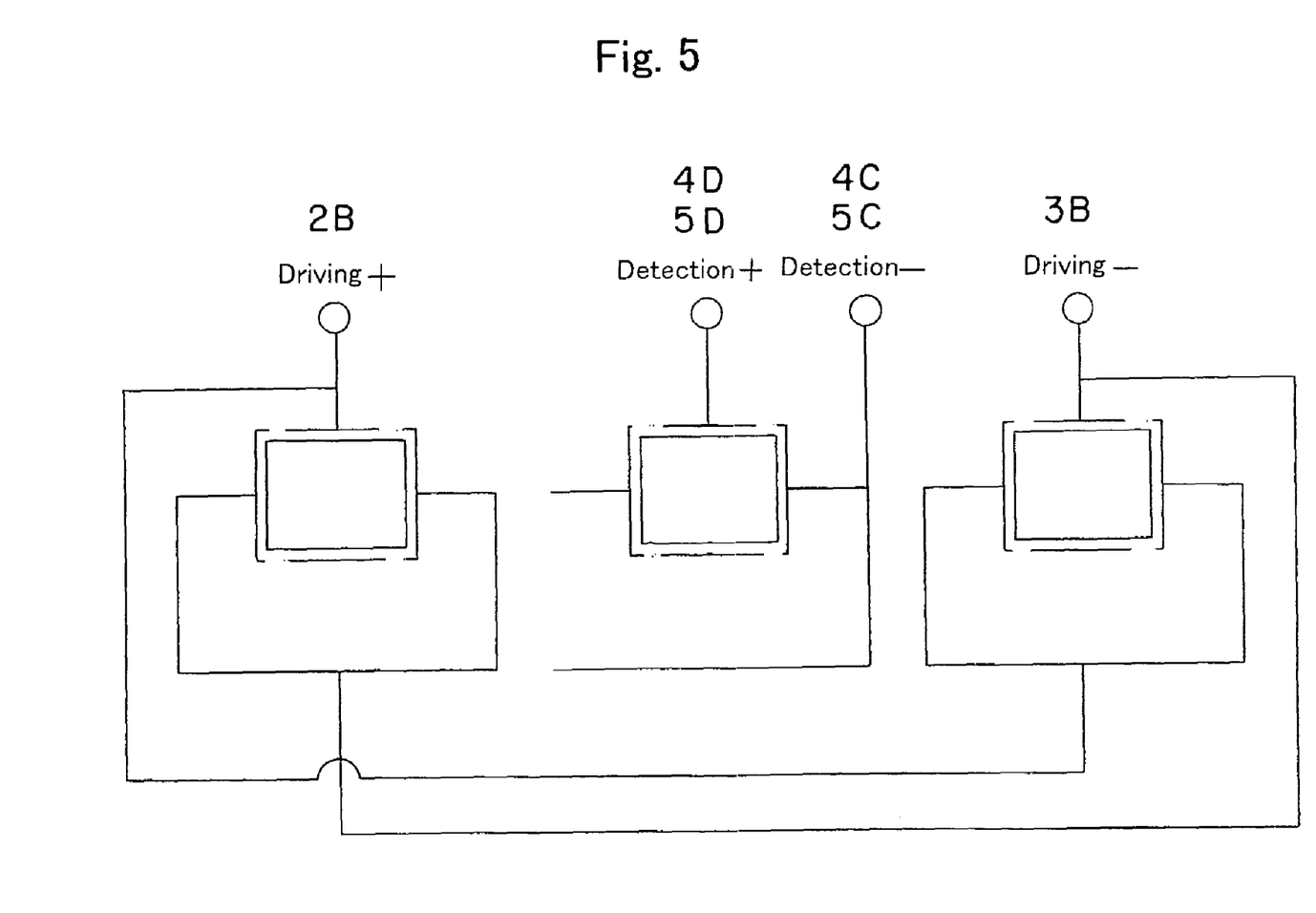
FIG. 5 is a diagram schematically showing wirings of driving and detection electrode pads.

A voltage signal is applied on the signal pads 2B for driving and ground pads 3B for detection, for example, from a circuit shown in FIG. 5 to excite driving vibration in the driving vibration arms. Detection vibration is thus excited in the detection vibration arms to provide output signals. The potentials of the signal pads 4C and 4D for detection with respect to the ground pads 5C and 5D for detection are assigned output signals P1 and P2, respectively.

For example, it is provided that the frequency of the detection vibration is higher than that of the driving vibration, the frequency of a spurious vibration is higher than that of the driving vibration, the output signal P1 is larger than P2 and the phase of P1 is positive. In this case, the weight of the weight adjusting film D2 is removed. It is thus possible to reduce the weight of the driving vibration arm having the D2 and the unbalance of the driving vibration.

It is provided that the frequency of the detection vibration is higher than that of the driving vibration, the frequency of a spurious vibration is higher than that of the driving vibration, the output signal P1 is larger than P2 and the phase of P1 is negative. In this case, the weight of the weight adjusting film D4 is removed.

It is provided that the frequency of the detection vibration is higher than that of the driving vibration, the frequency of a spurious vibration is higher than that of the driving vibration, the output signal P1 is smaller than P2 and the phase of P1 is positive. In this case, the weight of the weight adjusting film D1 is removed.

It is provided that the frequency of the detection vibration is higher than that of the driving vibration, the frequency of a spurious vibration is higher than that of the driving vibration, the out put signal P1 is smaller than P2 and the the metal film, the controllability of the vibrations can be improved and the properties of the weight adjusting film can be maintained over a long time period due to a large specific weight of gold. Because a gold film has poor adherence with an oxide film such as quartz film, however, it is preferred to provide an underlayer such as chromium or titanium film between the vibration arm such as an arm made of quartz and the gold film.

The weight adjusting film may be produced by any known methods such as vacuum vapor deposition, sputtering, electroplating, electroless plating or the like.

After the weight adjusting film is formed on a vibrator, a part of the material may be removed from the film by irradiating laser beam onto the film or reverse sputtering.

The material of the vibrator is not particularly limited, and may preferably be a piezoelectric single crystal such as quartz, $LiNbO_3$, $LiTaO_3$, lithium niobate-lithium tantalate solid solution $(Li(Nb, Ta)O_3)$ single crystal, lithium borate single crystal or langasite single crystal.

The wiring, electrodes and pads may be composed of a conductive film. Such conductive film may preferably be a metal film such as a gold film, a multilayer film of gold and chromium, a multilayer film of gold and titanium, silver film, a multilayer film of silver and chromium, a multilayer film of silver and titanium, a lead film or platinum film, or a metal oxide film such as $TiO_2$. Because a gold film has poor adherence with an oxide film such as quartz film, however, it is preferred to provide an underlayer such as chromium or titanium film between the vibration arm such as an arm made of quartz and the gold film.

The wiring, electrodes and pads may be produced by any known methods such as vacuum vapor deposition, sputtering, electroplating, electroless plating or the like.

A physical quantity measured according to the present invention is not particularly limited. When a driving vibration is excited in a vibrator and the vibration state of the vibrator is changed due to the effects of a specific physical quantity exerted on the vibrator, the physical quantity is included in the present invention as far as the physical quantity can be detected through a detection circuit. Such physical quantity may preferably be an acceleration, an angular acceleration or an angular velocity applied on a vibrator. The measuring system of the present invention may preferably be an inertia sensor.

The present invention may preferably be applied to a vibratory gyroscope of so-called horizontal setting type. In a vibratory gyroscope of horizontal setting type, a vibrator is elongated along a specified plane substantially perpendicular to a rotating axis. Particularly preferably in this case, both of the driving and detection vibration arms vibrate along the specified plane. FIGS. 1 to 4 relates to this embodiment of the present invention.

The present invention has been explained referring to the preferred embodiments, however, the present invention is not limited to the illustrated embodiments which are given by way of examples only, and may be carried out in various modes without departing from the scope of the invention.

The invention claimed is:

1. A method of measuring a physical quantity using a vibrator, wherein said vibrator comprises our driving vibration arms, first and second detection vibration arms, films for adjusting a weight provided on said driving vibration arms, respectively, and detecting electrodes provided on each of said detection vibration arms, respectively, said method comprising the steps of:
    exciting a driving vibration in said vibrator;
    outputting output signals separately from each of said detecting electrodes based on a detection vibration excited in said vibrator responsive to said physical quantity; and
    comparing a frequency of said driving vibration to a frequency of said output signals;
    comparing an amplitude of said output signal from said first detection vibration arm with an amplitude of said output signal from said second detection vibration arm;
    comparing a phase of said output signal from said first detection vibration arm with a phase of said output signal from said second detection vibration arm;
    adjusting said weight of said film based on said comparisons of said frequencies, said amplitudes, and said phases.

2. The method of claim 1, wherein said driving and detection vibration arms vibrate in bending vibration mode along a specified plane.

3. The method of claim 1, wherein said weight of said film is adjusted so that a difference of said output signals from said detection electrodes is lowered.

4. The method of claim 1, wherein said vibrator is formed by etching.

5. A device for measuring a physical quantity using a vibrator, wherein said vibrator comprises our driving vibration arms, first and second detection vibration arms, films for adjusting a weight provided on each of said driving vibration arms, and detecting electrodes provided on each of said detection vibration arms, said device comprising:
    means for exciting a driving vibration in said vibrator; and
    means for comparing frequency of said driving vibration to a frequency of output signals from said detecting electrodes;
    means for comparing an amplitude of said output signal from said first detection vibration arm with an amplitude of said output signal from, said second detection vibration arm;
    means for comparing a phase of said output signal from said first detection vibration arm with a phase of said output signal from said second detection vibration arm;
    means for adjusting said weight of said films based on a comparison of said frequencies, said amplitudes and said phases of said output signals, wherein said output signals are output from said detecting electrodes based on a detection vibration excited in said vibrator responsive to said physical quantity.

6. The device of claim 5, wherein said driving and detection vibration arms vibrate in bending vibration mode along a specified plane.

7. The device of claim 5, wherein said weight of said film is adjusted so that a difference of said output signals from said detection electrodes is lowered.

8. The device of claim 5, wherein said vibrator is formed by etching.

* * * * *

UNITED STATES PATENT AND TRADEMARK OFFICE
CERTIFICATE OF CORRECTION

PATENT NO. : 7,168,289 B2  Page 1 of 1
APPLICATION NO. : 10/876361
DATED : January 30, 2007
INVENTOR(S) : Takayuki Kikuchi It is certified that error appears in the above-identified patent and that said Letters Patent is hereby corrected as shown below:

Column 3
    *Line 12*: please change "390B" to --30B--

Column 4
    *Line 60*: please change "become" to --becomes--

Column 7
    *Line 30*: please change "our" to --four--

Column 8
    *Line 14*: please change "our" to --four--
    *Line 21*: please add --a-- after "comparing"
    *Line 26*: please delete "," after "from"

Signed and Sealed this

Tenth Day of April, 2007

JON W. DUDAS
*Director of the United States Patent and Trademark Office*